Nov. 21, 1939. B. L. LORENZEN 2,180,877
CONTINUOUS OPERATION CENTRIFUGAL JUICE EXTRACTOR
Filed Nov. 19, 1938
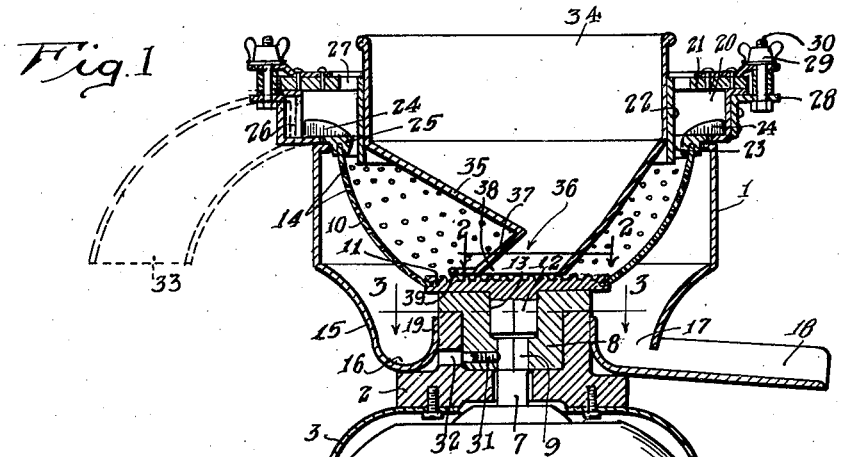
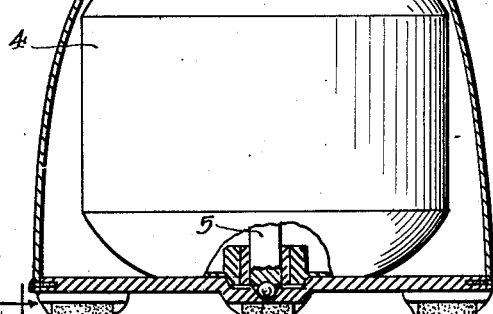
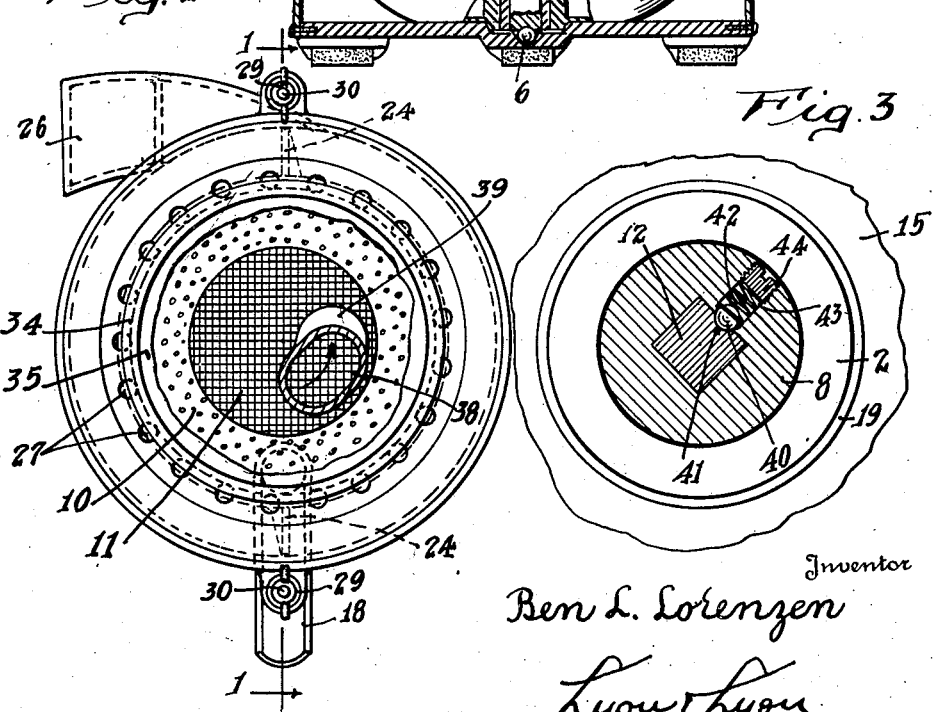
Inventor
Ben L. Lorenzen
By Lyon & Lyon
Attorneys Patented Nov. 21, 1939

2,180,877

UNITED STATES PATENT OFFICE 2,180,877

CONTINUOUS OPERATION CENTRIFUGAL JUICE EXTRACTOR

Ben L. Lorenzen, Los Angeles, Calif., assignor of one-half to Charles S. Frank, Los Angeles, Calif.

Application November 19, 1938, Serial No. 241,419

4 Claims. (Cl. 146—3)

This invention relates to centrifugal vegetable or fruit grinders for producing a pulp, and for extracting the juice from the pulp through the agency of centrifugal force. Many machines have been constructed for this purpose, but they generally necessitate operating upon a batch of chopped vegetables or fruit, and the pulp accumulates in the machine, although many of these machines provide for the continuous delivery of the juice.

The general object of this invention is to produce a machine of this kind, which is so constructed that it can operate continuously to deliver the juice and also to deliver the pulp from the machine so that the vegetables or fruit can be fed into the same continuously and without necessitating the discontinuing of the operation in order to remove accumulated pulp.

In its construction, the machine preferably includes mechanical means for ejecting the pulp from the machine. In the present embodiment of the invention it includes a centrifugal basket rotating at a high speed, and the ejector means employed is associated with the upper edge or rim of the basket over which the pulp is delivered.

As this ejector therefore rotates at a high speed, there is a tendency for the operation of the ejector to produce a back draft through the juice outlet from the casing. One of the objects of this invention is to provide means for preventing the development of a back draft through the juice outlet in a machine of this type.

In some machines for grinding vegetables and fruit, a hopper is provided that has a follower or pusher that presses against the fruit or vegetables to press them forcibly against the grinder or burr that reduces the same to pulp. One of the objects of this invention is to construct the hopper that carries the fruit and vegetables, in such a way that at the point where the material to be ground, encounters the grinder, the hopper wall is formed in such a way that the rotation of the burr will force the chopped pieces of fruit or vegetables into a narrowing throat, thereby insuring that by the reaction of the wall of the throat, the material will be pressed forcibly onto the grinding face of the burr.

A further object of the invention is to improve the general construction of machines of this type, and to provide a simple arrangement of parts enabling the motor for the machine to be carried in its base with the hopper, and the grinder located within the casing of the machine above the motor so that the same are readily accessible and removable without disturbing the motor in any way.

Further objects of the invention will appear hereinafter.

The invention consists in the novel parts and combination of parts to be described hereinafter, all of which contribute to produce an efficient continuous operation centrifugal juice extractor.

A preferred embodiment of the invention is described in the following specification, while the broad scope of the invention is pointed out in the appended claims.

In the drawing:

Fig. 1 is a vertical section through a centrifugal vegetable or fruit grinder and juicer embodying my invention. This view may be regarded as a section taken substantially on the line 1—1 of Fig. 2, but showing a portion of the delivery spout for the pulp, in dotted lines. The lower end of the motor is broken away to illustrate a step bearing for the motor shaft.

Fig. 2 is a plan of the machine, but in this view the lower portion of the spout of the hopper is shown in horizontal cross-section at about the level of the line 2—2 of Fig. 1, with part of the hopper broken away.

Fig. 3 is a cross-section on the line 3—3 upon an enlarged scale, and particularly illustrating a sample disconnectible connection for enabling the centrifugal basket to be removed at will.

In practicing the invention I provide a casing having an outlet for the juice, and a hopper having an outlet located in such a way that as the material passes through the hopper it encounters the face of a grinder or burr that reduces the material to a pulp. A centrifugal basket is provided either formed of perforated sheet metal or mesh, which is rotated at a high speed by means of the motor, and the function of this basket is, of course, to separate the juice from the pulp by centrifugal action. Means is provided for guiding the juice to an outlet from the casing, and a continuously driven ejector means is provided for ejecting the pulp. With a machine of this type it is, of course, possible to drive the ejector for the pulp at a relatively low speed; but a very simple construction for the machine is possible if the ejector is formed directly at the delivery lip or upper edge of the centrifugal basket. But this necessitates a higher speed for the ejector than is actually necessary, and develops a tendency for the pulp ejector to act as a blower in ejecting the pulp. This tends to produce a back draft up through the juice spout or outlet, which must be overcome. In the present machine I provide means for overcoming this difficulty and permitting the pulp ejector to be driven at the high speed of the centrifugal basket.

In this machine also, the delivery of the pieces of fruit or vegetables onto the face of the grinder is effected in such a way that the force of the grinder face acting on the material, tends to force it through a narrowing throat, thereby insuring efficient feeding of the material through the machine, and avoiding the necessity for employing a follower or pusher to force the mass of fruit and vegetables against the grinder, or burr.

Referring more particularly to the parts, and especially to Figure 1, 1 indicates the upper casing of the machine which seats upon the fitting 2, and is carried by the base 3. This base 3 is in the form of a shell in which the motor 4 is mounted, the shaft 5 of the motor being supported on the step bearing 6 at its lower end, and having its upper end 7 extending up through the fitting 2, so as to form a connection to a bushing 8 that is driven when the machine is operated. The bushing 8 preferably has a square socket at its lower end, receiving a squared neck 9 on the upper end of the shaft 5. The bushing 8 supports a centrifugal basket 10, the bottom of which is preferably formed by a grinder or burr 11. This grinder or burr is of disc form with its under side preferably resting upon the upper face of the bushing 8. Also at its center and on its under side, the burr or grinder 11 is formed of a squared shank 12 to be received in a square socket 13. This enables the rotating bushing 8 to rotate the burr and the basket. I prefer to employ this type of connection because it facilitates removal and replacement of the burr and basket, and avoids the necessity for employing key-ways and keys as a driving connection. If desired, a D-form cross-section may be employed for this connection.

The basket 10 may be formed of stout wire gauze, but is preferably formed of sheet metal provided with a plurality of small perforations 14.

The basket 10 is of considerably smaller diameter than the upper casing 1, which is of shell form. As the juice passes outwardly through the perforations 14, it passes down through a contracted neck 15 to an annular gutter 16 formed in the same, and this gutter at one side has a juice outlet 17 at which a spout 18 is provided for delivering the juice into a container set up at one side of the base 3. The inner wall of the gutter 16 preferably extends upwardly so as to form an annular flange 19 that seats tight around the upper end of the fitting 2, which is of reduced diameter at this point.

The upper end of the casing 1 is provided with a receiver space 20 for the pulp that passes out of the basket, and the upper side of this receiver is closed by a removable cover 21, said cover preferably having a downwardly extending collar 22 that projects a slight distance into the upper end of the basket so as to form a relatively narrow throat 23 through which the pulp must pass upwardly. When the machine is in operation, this collar operates to retain pulp for some time and prevents its moving too rapidly up out of the basket.

Operating in the pulp receiver 20 I provide ejector means, and in the present instance this ejector means consists of two diametrically opposite blades 24. These blades 24 should be rather rudimentary in character because they are carried on a ring 25 secured to the upper edge or lip of the basket, and hence they rotate at a very high speed. While they are to act as impellers for driving the pulp forwardly and out of the pulp outlet 26, these vanes or blades should not be of any considerable area because in that case they would have too much pneumatic fan effect and tend to produce a back draft or induced air current flowing in to the juice outlet 17.

However, in order to overcome any tendency to produce such a back draft, I prefer to provide the cover 21 with air vents 27 opening communication with the atmosphere. This prevents forming a high partial vacuum in the annular chamber 20, and in this way prevents the back draft referred to.

The cover 21 seats upon an annular flange 28 to which it may be bolted by a plurality of removable wing nuts 29 threaded on bolts 30.

If desired, the squared neck 9 of the upper end 7 of the motor shaft may be clamped by means of a set screw 31 mounted in the bushing 8, and the rear end of which is accessible through an opening 32 drilled in the upper end of the fitting 2.

The pulp outlet is preferably provided with a tangential and downwardly projecting delivery spout 33 through which the pulp is driven by the impellers 24, and by the circulating current of air that is inducted through the openings 27.

In practice, it is found that it is not desirable to have a great number of the impeller vanes 24; in fact, if there are more than two, they manifest a tendency to become noisy.

The hopper 34 for the device has a substantially cylindrical upper portion that fits into the cylindrical collar 22, and the lower part 35 of the hopper is of substantially conical form and constructed in such a way that as the material feeds down, it will pass into a narrowing throat 36 (see Fig. 1). This throat is formed between an inclined face 37 of the wall of a spout 38 that extends down from the lower end of the "cone" 35 and projects in the general direction of rotation of the burr 11 as indicated by the arrow in Fig. 2. In other words, the lower end of the hopper forms a spout inclined in the direction of rotation and located so as to deliver the material onto the rough upper face of the grinder or burr 11. So as to insure a thorough grinding operation, the lower end of the spout is provided with a horizontal extension or foot 39, the under face of which lies very close to the upper face of the burr. This gives a considerable area of "contact" between the lower end of the spout and the face of the burr, forming a narrow space through which the material must pass.

It will be evident with this construction that chopped pieces of vegetables or fruit will be forced forwardly by the rotating burr against the inclined face 37, so that a wedging action is attained, tending to compress and squeeze the material down through the constantly narrowing throat, and finally through the space between the foot 39 and the face of the burr.

In order to hold the burr 11 and the basket 10 in place, I prefer to provide a yielding detent to cooperate with the square neck 12. For this purpose the lower part of the bushing 8 is provided with a ball-form detent 40 (see Fig. 3) a side of which is received in a small recess 41 in one of the flat side faces of the squared shank 9. This ball is pressed forwardly by a coil spring 42 carried in a drilled spring chamber 43, and backed up by a follower screw 44 threaded into the opening. This screw can be adjusted in or out to vary the force exerted by the spring on the rear side of the ball.

It will be evident that when the electric current is turned on through the motor 4, the grinder 11 and the basket 10 will be rotated at a high velocity. The vegetables or fruit coming down the spout 38 will be ground to a pulp between the upper face of the burr 11 and the foot 39, and this pulp will travel up the inner face of the wall of the cage or basket 10. As this occurs, the centrifugal force will withdraw the juice which passes through the perforations 14 and thence down and out of the machine through the spout 18.

In practice, of course, the pulp will become more or less packed in the pulp chamber under and behind the apron or collar 22. This prevents the pulp from passing too rapidly through the machine, and gives time for the centrifugal action to remove all the juice. Eventually, however, due to the contour of the basket or cage, the pulp forces itself up through the annular outlet 23 into the pulp receiver 20 where it will be ejected by the rotating impellers 24, and thrown out through the spout 26.

Atmospheric air flowing in through the openings 27 prevents the development of a high vacuum in the chamber 20, which might cause a back flow of air in through the juice outlet 17. It is evident that this machine can operate continuously, and after using it from time to time, the machine can be cleaned by removing the hopper and basket.

Many other embodiments of this invention may be resorted to without departing from the spirit of the invention.

What I claim is:

1. In a centrifugal vegetable or fruit grinder and juicer, the combination of a casing having an outlet for the juice, a hopper having an outlet within the casing, a grinder of substantially disc form positioned within the casing to receive the material from the hopper outlet to grind the same to a pulp, a centrifugal basket surrounding the grinder and having its side wall sloping upwardly and outwardly of the grinder and including means for driving the same at a high speed to pass the juice through the wall of the basket, retain the pulp and force the pulp up and over the wall of the basket, said casing having an annular receiver space within the same communicating with the upper edge of the basket for receiving pulp therefrom, and ejector means carried by the basket and moving at the annular receiver for ejecting the pulp from the receiver space.

2. In a centrifugal vegetable or fruit grinder and juicer, the combination of a substantially enclosed casing having an outlet for the juice, a hopper having an outlet within the casing, a grinder positioned within the casing adjacent the hopper outlet to receive material from the hopper to grind the same to a pulp, a centrifugal basket positioned within the casing to receive juice and pulp from the grinder and including means for driving the same at a high speed to pass the juice through the wall of the basket and retain the pulp, the side wall of said basket flaring upwardly and outwardly enabling the centrifugal force to pass the pulp upwardly and out of the basket, said casing having an annular receiver space within the same in communication with the upper edge of the basket to receive pulp therefrom, ejector means carried by the basket and moving at the annular receiver space for ejecting the pulp from the receiver, and means for breaking the partial vacuum developed by the ejector means to prevent the same from inducing an inward flow of air at the juice outlet of the casing.

3. In a centrifugal vegetable or fruit grinder and juicer, the combination of a substantially enclosed casing having an outlet for the juice, a hopper having an outlet within the casing, a grinder positioned within the casing adjacent the hopper outlet to receive material from the hopper to grind the same to a pulp, a centrifugal basket positioned within the casing to receive juice and pulp from the grinder and including means for driving the same at a high speed to pass the juice through the wall of the basket and retain the pulp, the side wall of said basket flaring upwardly and outwardly enabling the centrifugal force to pass the pulp upwardly and out of the basket, said casing having an annular receiver space within the same in communication with the upper edge of the basket for receiving the pulp from the basket, ejector means carried by the basket and operating at the annular receiver space for ejecting the pulp from the receiver, and means for admitting atmospheric air into the casing to prevent the ejector means from inducing a back draft air current through the juice outlet.

4. In a centrifugal vegetable or fruit grinder, the combination of a casing having an outlet for the juice, a cover for the casing having a downwardly extending collar within the casing, a hopper received in said collar and having a spout extending downwardly inside the casing, a grinder positioned within the casing adjacent the hopper spout to receive material from the hopper to grind the same to a pulp, a centrifugal basket having an upwardly and outwardly sloping wall positioned within the casing to receive juice and pulp from the grinder and including means for driving the same at a high speed to subject the pulp to centrifugal action and cause the same to move up the wall of the basket and over its upper edge, the lower edge of said collar being located adjacent the upper edge of the basket so as to form a relatively narrow annular throat between the collar and upper edge of the basket through which the pulp passes upwardly, said casing having an annular receiver space within the same above the basket and in communication with said throat for receiving pulp therefrom, and ejector means carried by the basket and moving within said annular receiver space for ejecting the pulp from the receiver.

BEN L. LORENZEN.